United States Patent

Ise

[15] 3,647,338
[45] Mar. 7, 1972

[54] DISC RECORD INJECTION MOLDING MACHINE

[72] Inventor: Hideo Ise, Kawasaki-shi, Japan

[73] Assignee: Nippon Columbia Kabushikikaisha (Nippon Columbia Co., Ltd.), Tokyo, Japan

[22] Filed: Sept. 15, 1969

[21] Appl. No.: 857,948

[52] U.S. Cl. ............................................. 425/247, 425/449
[51] Int. Cl. ..................................................... B29d 17/00
[58] Field of Search ................ 18/5.3, 30 R, 30 PM, 30 PG,
    18/30 PP, 30 PT, 42 D, 42 R, 2 RM, 2 RP, 30 WM

[56] References Cited

UNITED STATES PATENTS

| 2,914,805 | 12/1959 | Morin | 18/42 |
| 2,992,455 | 7/1961 | Salzman | 18/5.3 |
| 3,112,523 | 12/1963 | Goulet et al. | 18/5.3 |
| 3,417,433 | 12/1968 | Teraoka | 18/30 |

Primary Examiner—J. Spencer Overholser
Assistant Examiner—Michael O. Sutton
Attorney—Hill, Sherman, Meroni, Gross & Simpson

[57] ABSTRACT

A disc record injection molding machine having a metal mold consisting of a plurality of templets, the metal mold having a plurality of record molding cavities and runners leading thereto, means for injecting record material into the cavities through the runners, means for assembling the templets to form the metal mold and disassembling them, and means for boring central openings through molded records and pushing out the material remaining in the runners.

1 Claims, 19 Drawing Figures

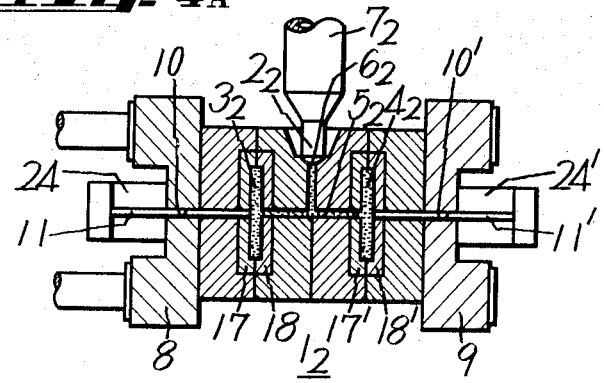
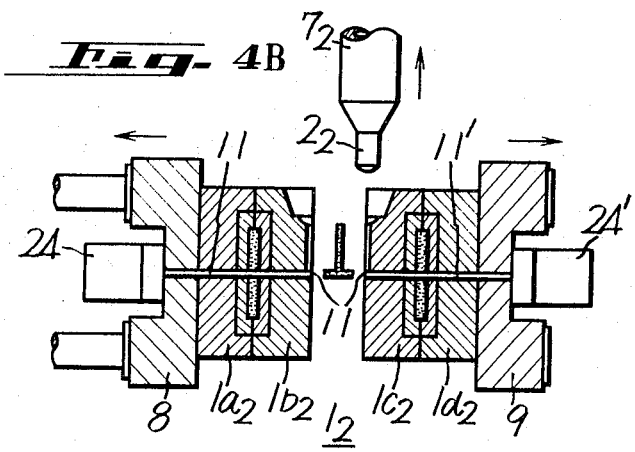
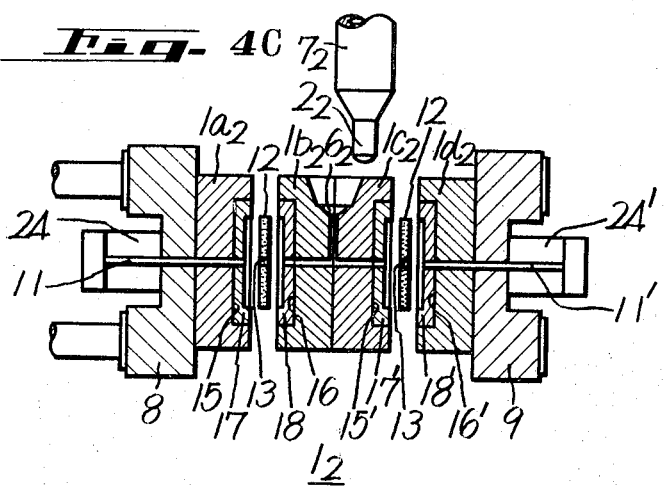

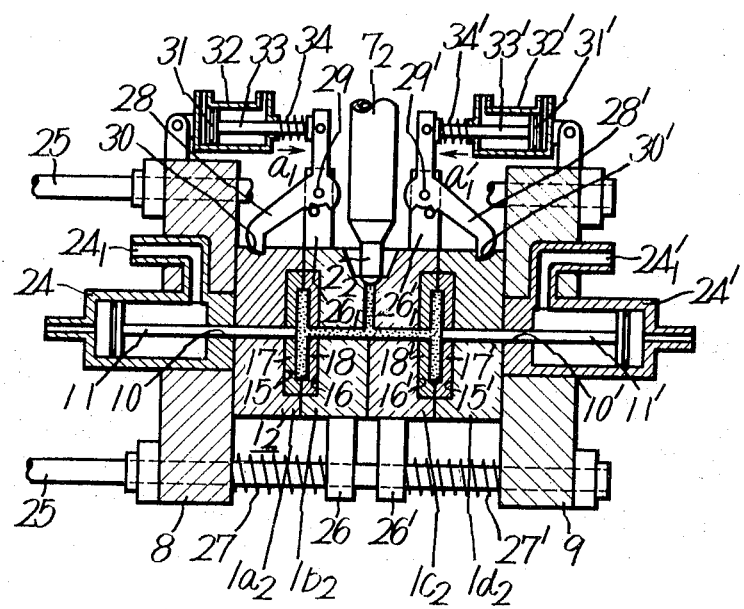

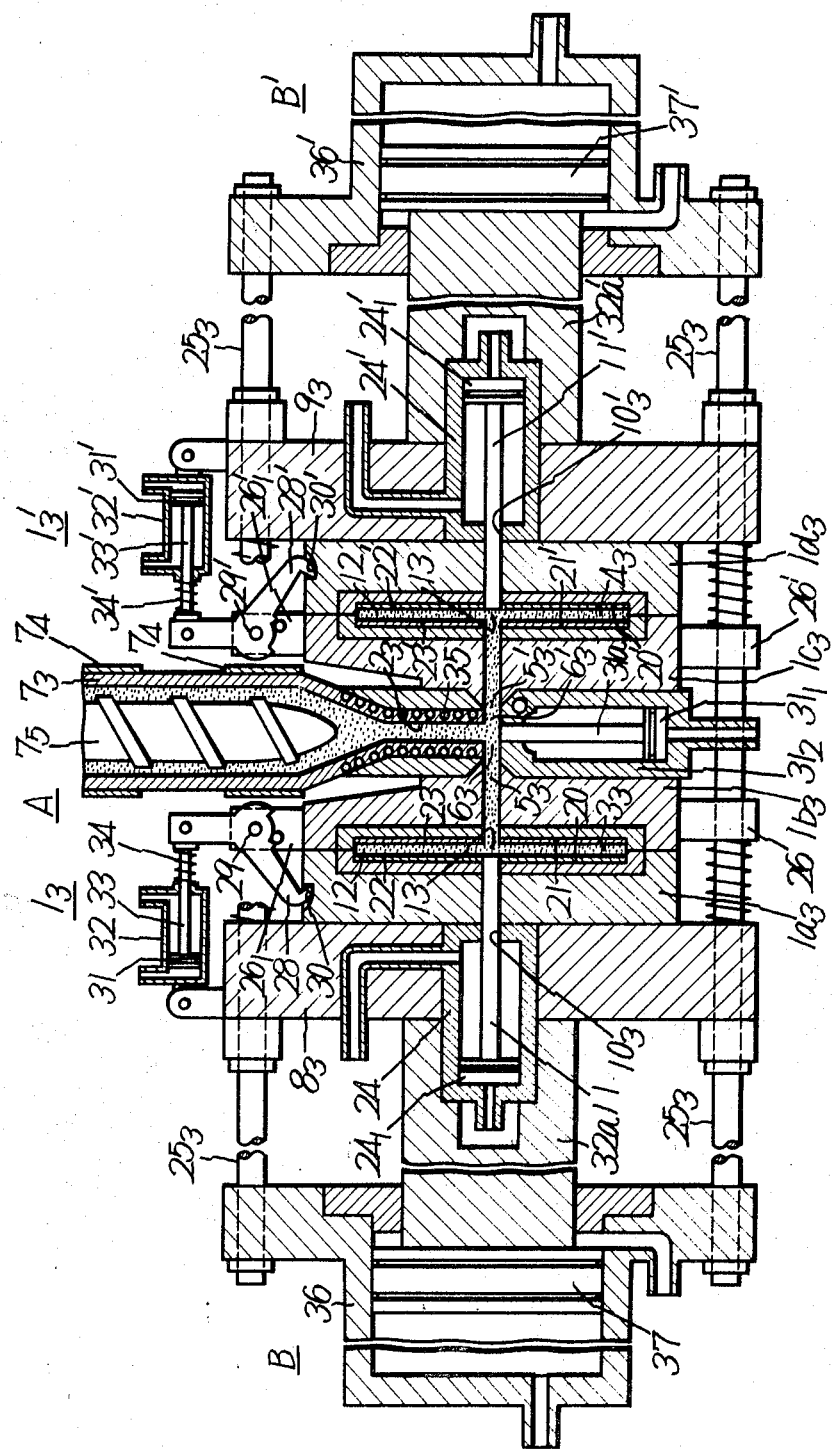

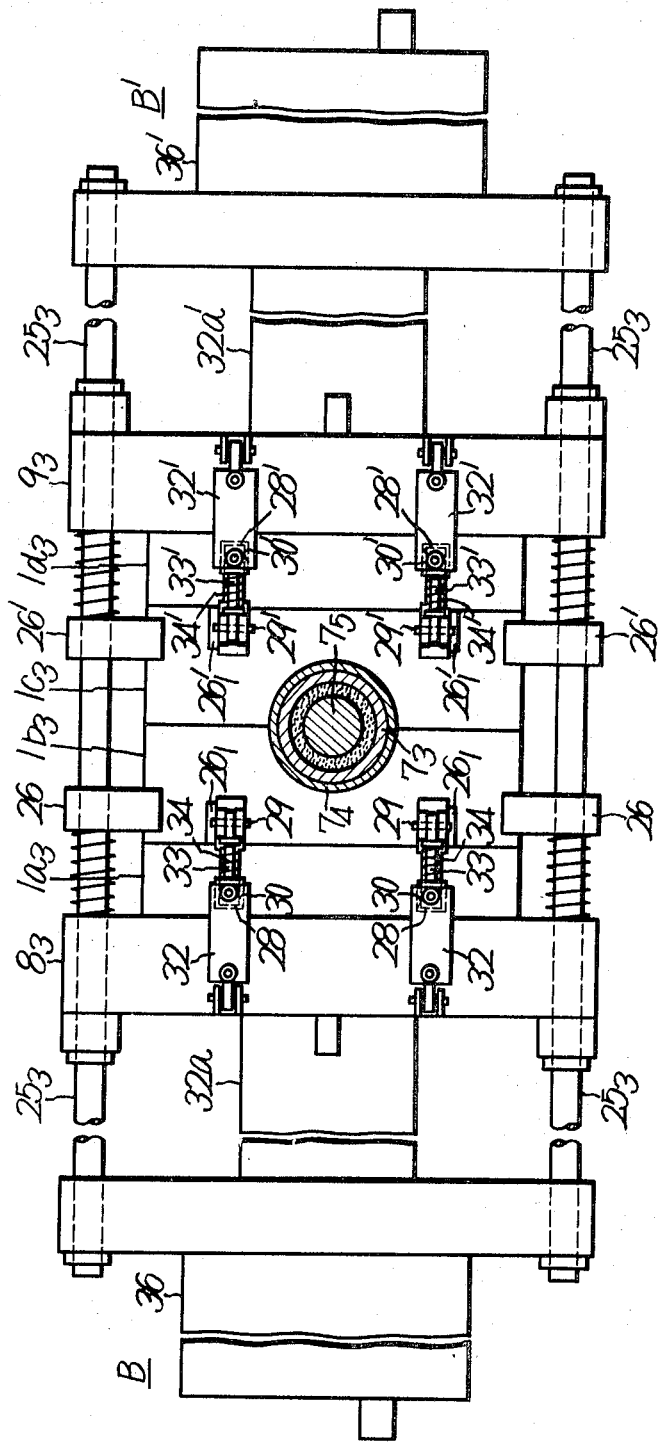

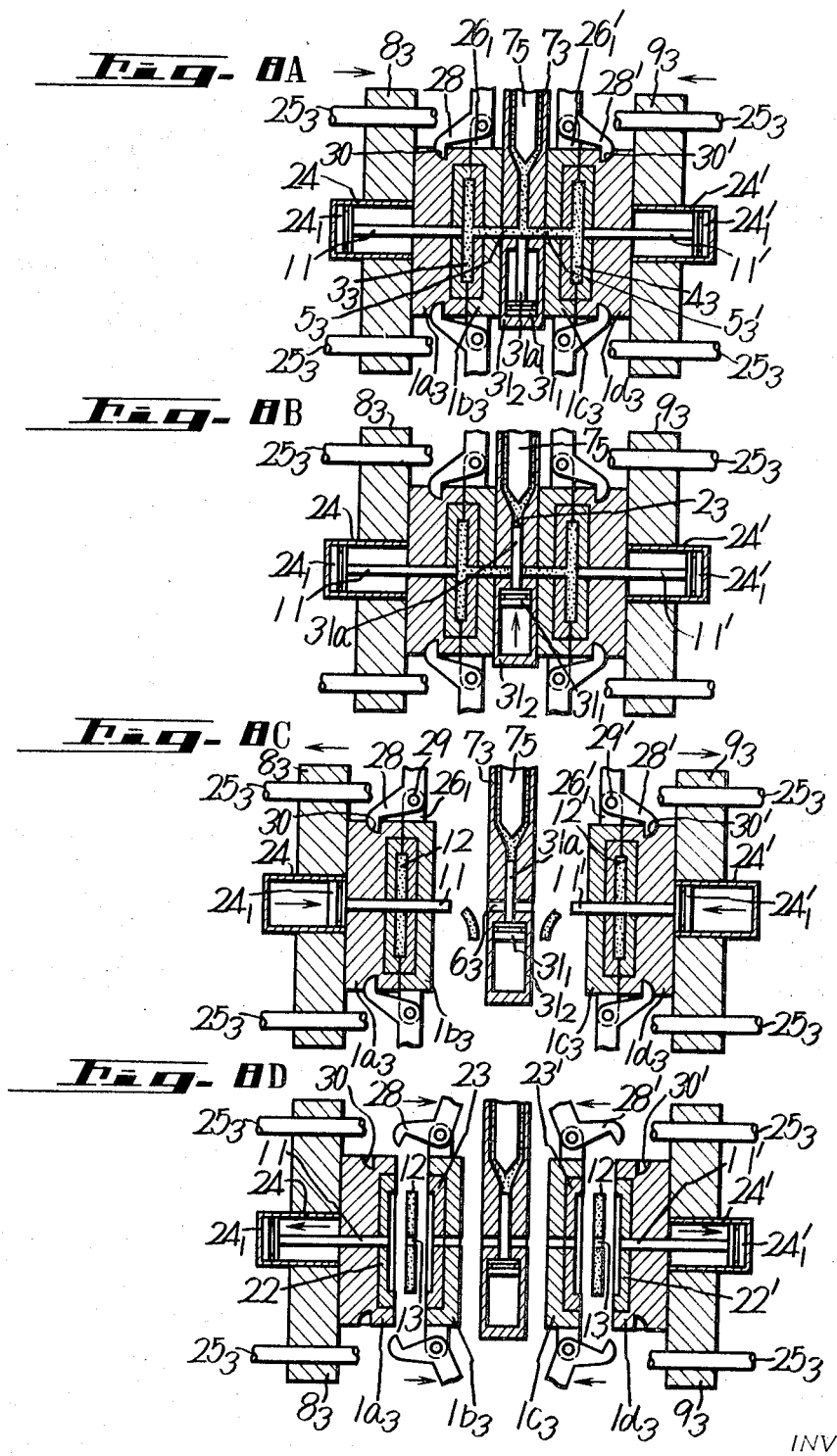

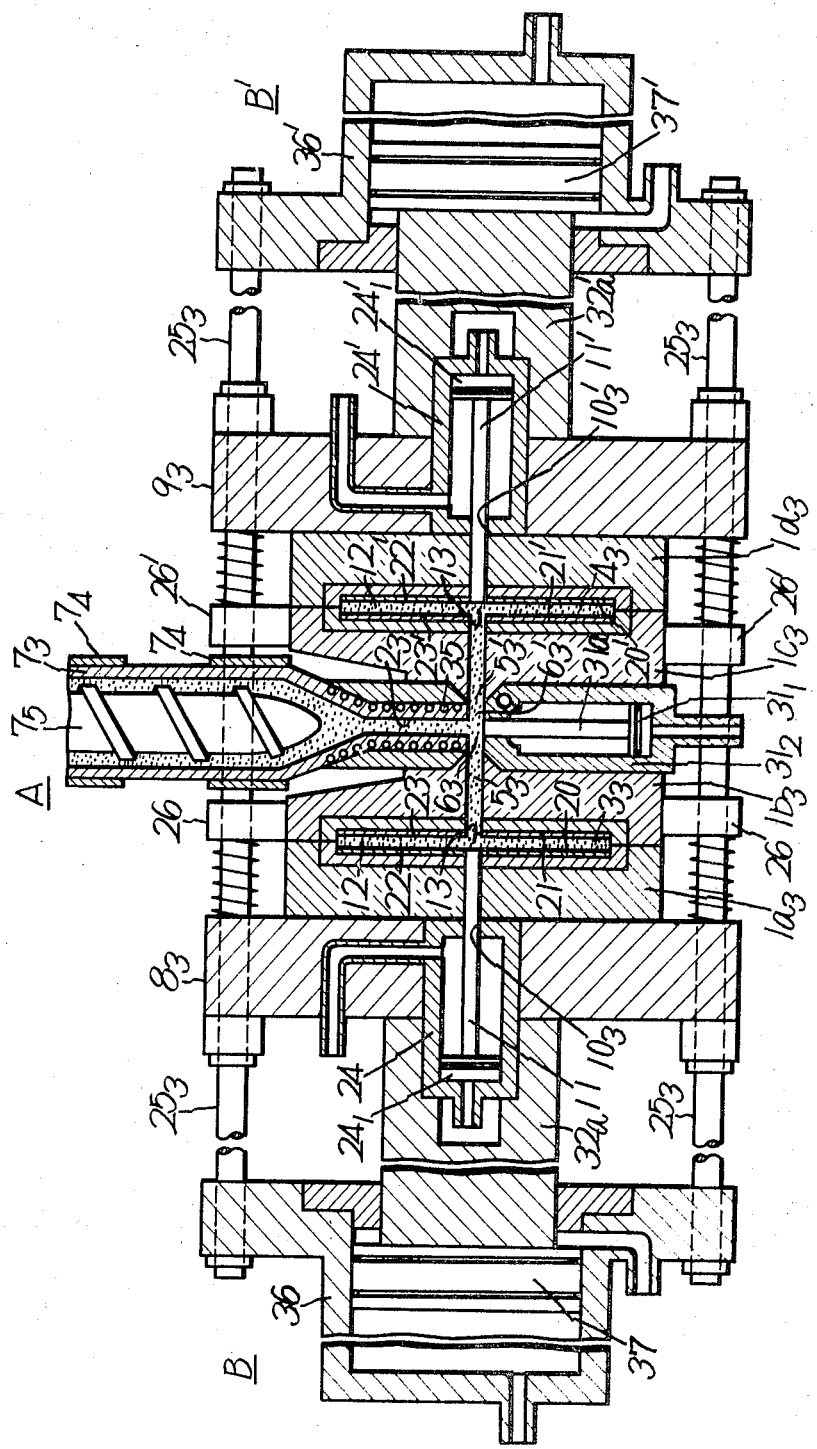

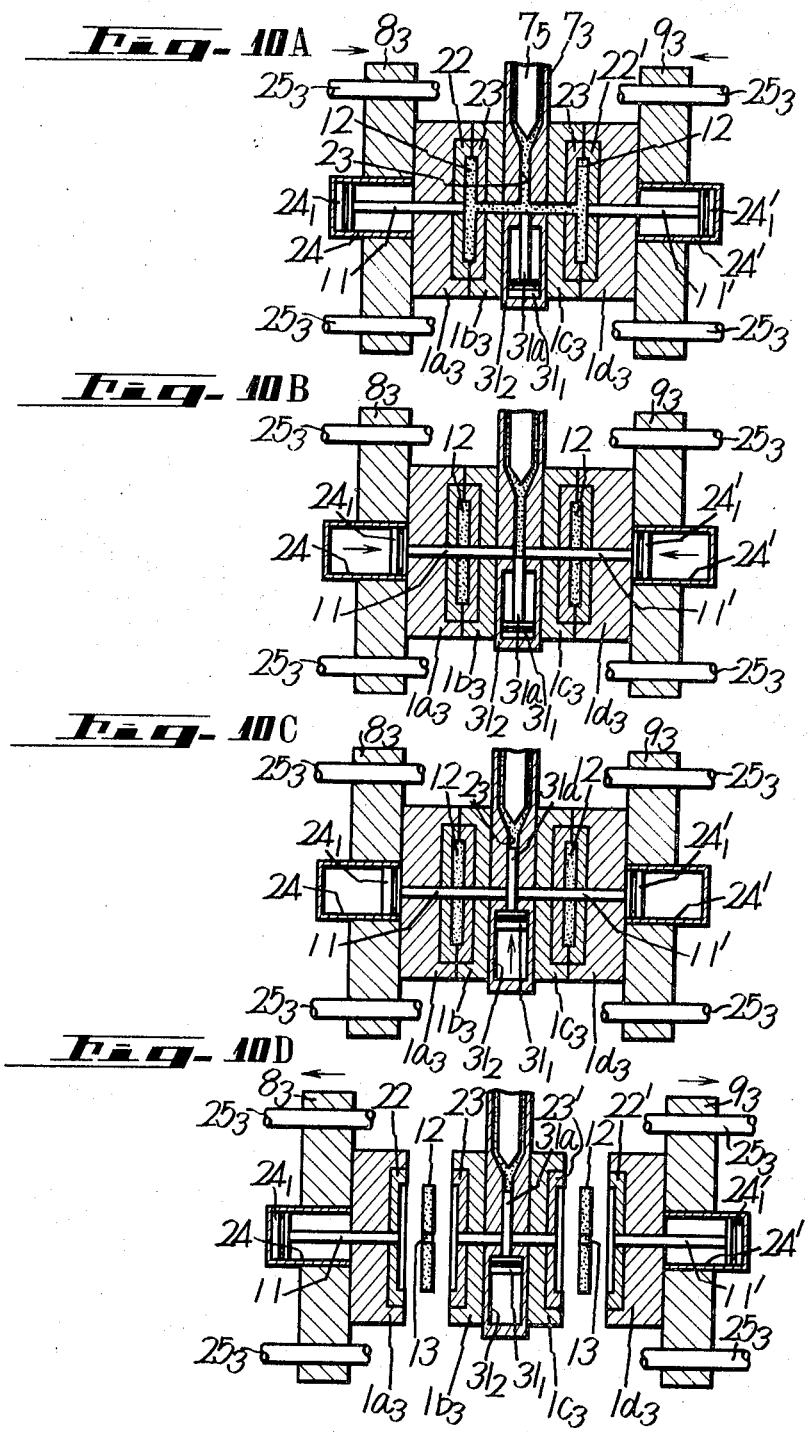

DISC RECORD INJECTION MOLDING MACHINE

BACKGROUND OF THE INVENTION

1. Field of the Invention

This invention relates to a disc record injection molding machine, and more particularly to a disc record injection molding machine which is capable of simultaneous molding of a plurality of disc records.

2. Description of the Prior Art

A conventional method for injection molding of disc records is to inject heated, molten material into a metal mold through its central aperture open to the outside. In the case of injection molding of a 17 cm. disc record having a diameter smaller than a 30 or 25 cm. disc record by the prior art method using vinyl chloride which is most suited for disc records or a mixture of vinyl chloride with vinyl acetate or other copolymer resin of high-melting point and high viscosity, simultaneous injection molding of plural, for example, two disc records is difficult, since the thickness of the records is strictly limited to a standardized size such, for example, as $0.8\pm0.2$ mm. at the central portion thereof, 1.7 to 2.3 mm. at the label portion and 0.6 to 1.3 mm. at the sound groove portion. Especially, a nonstandardized thickness of the central portion of the disc record impedes the use of an adapter for automatic playing and a severe limitation is imposed upon the making of disc records which satisfy the requirements. In the injection molding of the disc record the so-called short shot is likely to occur in the sound groove portion, since the central portion of the record is thinner than the label portion. Such short shot introduces nonuniformity in the density of molded disc records. Further, since the diameter of the 30 cm. and 25 cm. disc records is large for their thickness, the conventional injection molding method is likely to introduce the aforementioned short shot. Although the short shot can be avoided with the use of an injection molding machine of high injection pressure and mold clamping force, such a machine is bulky and expensive and high-injection pressure causes an increase in internal stress, with the result that the molded disc record is likely to warp and is brittle and easy to crack and low in abrasion resistance.

The short shot may be avoided by raising the melting point of a material to be injected so as to lower its viscosity. In this case, however, the material such as vinyl chloride or a resin of vinyl chloride and acetate or the like has a narrow temperature range from its melting to thermal decomposition, so that temperature control is difficult and decomposition of the material is caused to make the injection molding impossible.

SUMMARY OF THE INVENTION

The primary object of the present invention is to provide a disc record injection molding machine which enables simultaneous production of a plurality of disc records by one shot injection of a molten record material through the use of a metal mold having a plurality of disc record molding cavities.

BRIEF DESCRIPTION OF THE DRAWINGS

FIGS. 4A, 4B and 4C are schematic diagrams, partly in cross section, showing the machine of this invention, for explaining the operation thereof;

FIG. 5 is a partial cross-sectional view of the principal part of the machine of this invention depicted in FIGS. 2, 3 and 4;

FIG. 6 is a plan view, partly in cross section, showing another example of the disc record injection molding machine produced according to this invention;

FIG. 7 is a side view of the machine shown in FIG. 6;

FIGS. 8A to 8D, inclusive, are schematic diagram, partly in cross section, illustrating the machine of FIG. 7, for explaining the operation thereof;

FIG. 9 is a plan view, partly in cross section, showing still another example of the disc record injection molding machine of this invention; and FIGS. 10A to 10D, inclusive, are schematic diagrams, partly in cross section, showing the machine of FIG. 9, for explaining the operation thereof.

DESCRIPTION OF THE PREFERRED EMBODIMENTS

To facilitate a better understanding of the present invention, a description will be given first of a conventional type of a disc record injection molding machine.

Figure 1A:
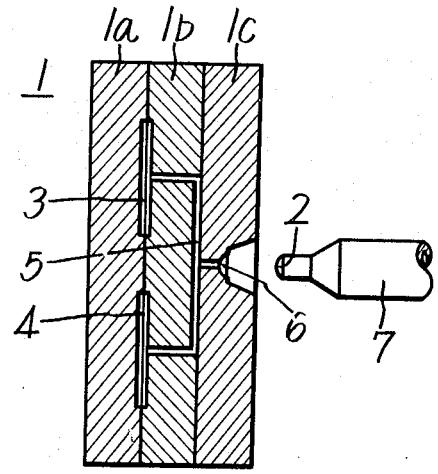
FIGS. 1A and 1B are partial cross-sectional views of metal molds used in conventional injection molding machines adapted for simultaneous molding of two disc records.
Figure 1B:
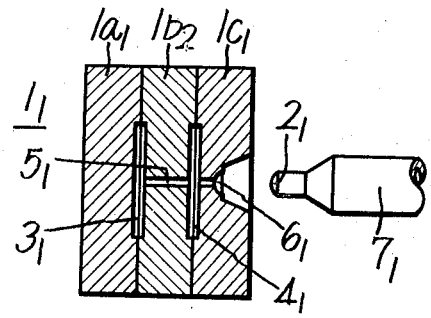

In FIGS. 1A and 1B there are illustrated prior art machines for injection molding of more than two disc records with one shot. In the example shown in FIG. 1A a metal mold 1 consists of three templets $1a$, $1b$ and $1c$, in which two record molding cavities 3 and 4, each having a plane making a substantially right angle with the axial direction of a mold material injection nozzle 2, and formed between the templets $1a$ and $1b$ in side-by-side relation. Further, a substantially U-shaped runner 5 leading to the cavities 3 and 4 at substantially the central portions thereof is formed across the templets $1b$ and $1c$ and therebetween and a sprue 6 contiguous to the runner 5 is formed in the templet $1c$, as clearly shown in the figure. Reference numeral 7 designates a molten record material supply cylinder. With such an arrangement, the runner 5 is long and relatively complicated, so that a molten material, jetted from the nozzle 2 of the cylinder 7 to the sprue 6, is very likely to become cooled and hardened on its way to the cavities 3 and 4, which results in a difficulty in molding of disc records. Further, the use of such a metal mold increases the area of a die plate (not shown) for mounting thereon the metal mold and consequently requires a bulky machinery equipment and, in addition, complete removal of the material remaining in the runner 5 is required for each injection and boring of the central openings through the disc records cannot be achieved in the split metal mold 1.

In the example shown in FIG. 1B, a metal mold $1_1$ is made up of three templets $1a_1$, $1b_1$ and $1c_1$, in which two record molding cavities $3_1$ and $4_1$; each having a plane making a substantially right angle with the axial direction of a nozzle $2_1$, are formed in both faces of the templet $1b_1$ and in the faces of the templets $1b_1$ and $1c_1$ on the side of the templet $1a_1$ in alignment with the axis of the nozzle $2_1$. Further, a runner $5_1$ and a sprue $6_1$ are formed in alignment with the axis of the nozzle $2_1$. In injection molding of disc records with the machine of such a construction using vinyl chloride or a mixture of vinyl chloride with vinyl acetate or other copolymer resin of high melting point and high viscosity, the molten material injected into the cavity $4_1$ on the side of the nozzle $2_1$ is more than that injected into the cavity $3_1$ on the opposite side from the nozzle $2_1$ and the short shot is likely to occur in the cavity $3_1$, thus it is difficult to inject the molten material equally into the both cavities. In order to avoid this, it is necessary to increase the thickness of the record to be molded with the cavity $3_1$ on the opposite side from the nozzle $2_1$. This increases the manufacturing cost of the disc records in terms of the material and the resulting records become nonstandardized. In addition, the formation of the sound grooves becomes incomplete to lower tone quality.

Figure 2:
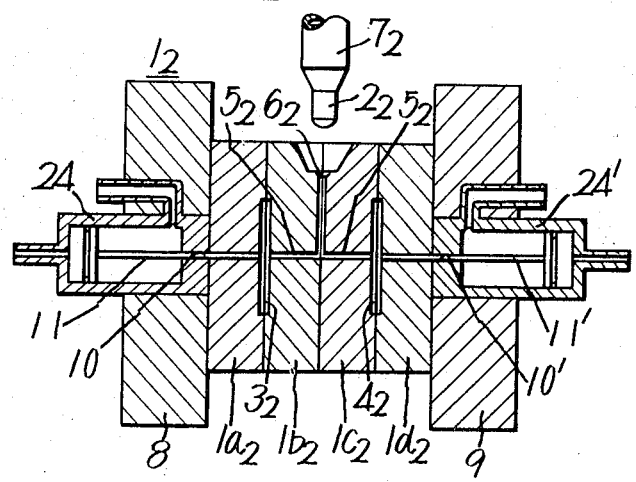
FIGS. 2 and 3 show, in cross section, examples of a metal mold used in a disc record injection molding machine produced according to this invention.

FIG. 2 illustrates one example of a metal mold $1_2$ for disc record injection molding according to this invention, in which the metal mold $1_2$ is made up of four templets $1a_2$, $1b_2$, $1c_2$ and $1d_2$ as shown. In the metal mold $1_2$ there are provided between the templets $1a_2$ and $1b_2$, $1c_2$ and $1d_2$ record molding cavities $3_2$ and $4_2$ having parallel planes which are symmetrical relative to the axial direction of a nozzle $2_2$ attached to a cylinder $7_2$ and runners $5_2$ are formed across the templets $1b_2$ and $1c_2$ which lead to the centers of the cavities $3_2$ and $4_2$. The runners $5_2$ are formed straight to make a right angle with the planes of the cavities $3_2$ and $4_2$. While, a sprue $6_2$ contiguous to the runners $5_2$ is formed between the templets $1b_2$ and $1c_2$ in the axial direction of the nozzle $2_2$ as illustrated in the figure.

The lengths of the runners $5_2$ from the sprue $6_2$ to the cavities $3_2$ and $4_2$ are equal to each other and this length is rendered to be as short as possible, which ensures uniform supply of the material jetted from the nozzle $2_2$ to the both cavities $3_2$ and $4_2$ and simultaneous injection molding of two disc records with one shot.

Figure 3:
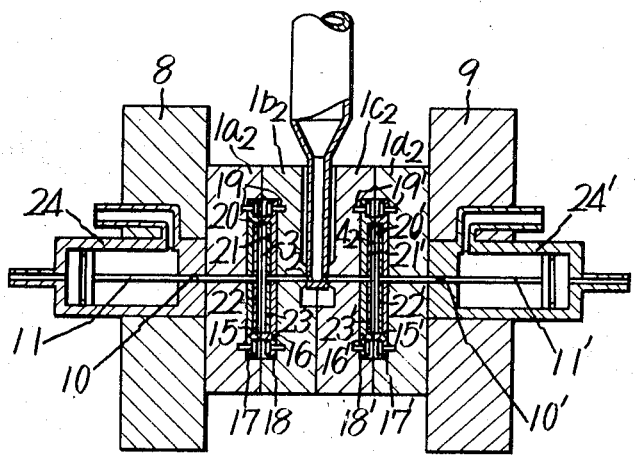

Turning now to FIGS. 3 and 4, a description will be given of one example of a disc record injection molding machine of this invention employing the metal mold $1_2$ shown in FIG. 2.

One of the templets of the metal mold $1_2$, the left-hand templet $1a_2$ in the illustrated example, is fixed to a moving die plate 8 and the right-hand templet $1d_2$ is fixed to a fixed die plate 9 and, in addition, the intermediate templets $1b_2$ and $1c_2$ are mechanically coupled with a drive unit which is adapted to be movable simultaneously with or independently of the moving die plate 8. In FIG. 5 there is shown one example of the drive unit, in which the moving die plate 8 is slidably attached to plural, for example, four parallel guide rods 25 and the templets $1b_2$ and $1c_2$ are slidably mounted on the guide rods 25 through projecting pieces 26 and 26' provided on both sides of the templets $1b_2$ and $1c_2$. Namely, the guide rods 25 slidably support the projecting pieces 26 and 26' and springs 27 and 27' are interposed respectively between the projecting piece 26 and the moving die plate 8 and between the projecting piece 26' and the fixed die plate 9 around the guide rods 25 so as to bias the templets $1b_2$ and $1c_2$ towards each other. To the other projecting pieces $26_1$ and $26_1'$ of the templets $1b_2$ and $1c_2$ there are rotatably pivoted by pins 29 and 29' substantially L-shaped rotary arms 28 and 28'. The rotary arms 28 and 28' are designed so that one end of each of them may engage corresponding one of recesses 30 and 30' formed in the templets $1a_2$ and $1d_2$. Further, oil- or pneumatic-pressure-actuated cylinders 32 and 32' for separating the templets are provided on the die plates 8 and 9 in such a manner that their piston rods 33 and 33' may run substantially parallel with the guide rods 25, and the other ends of the rotary arms 28 and 28' are respectively pivoted to the piston rods 33 and 33' of the cylinders 32 and 32'. The rotary arms 28 and 28' are respectively turned by the stroke motion of the piston rods of the cylinders 32 and 32' to disengage the ends of the arms 28 and 28' from the recesses 30 and 30' of the templets $1a_2$ and $1d_2$ and then the templets $1b_2$ and $1c_2$ are moved on the guide rods 25 together with the templets $1a_2$ and $1d_2$, in which case the templets $1b_2$ and $1c_2$ are respectively pushed by the springs 27 and 27' away from the templets $1a_2$ and $1d_2$, so that molded records can be taken out from between the templets $1a_2$ and $1b_2$ and between $1c_2$ and $1d_2$. Reference numerals 34 and 34' designate springs which are mounted on the piston rods 33 and 33' between free end faces of the cylinders 32 and 32' and the ends of the rotary arms 28 and 28'. These springs 34 and 34' serve to bring the free ends of the L-shaped rotary arms 28 and 28' into engagement with the recesses 30 and 30' of the templets $1a_2$ and $1d_2$ and to ensure the engagement when the metal mold $1_2$ is clamped as shown in, for example, FIG. 5, that is, when the pressure of the cylinders 32 and 32' is zero. One to four cylinders 32 and 32' and rotary arms 28 and 28' are mounted on the moving and fixed die plates 8 and 9 and the templets $1b_2$ and $1c_2$ as occasion demands. Further, apertures 10 and 10' similar to the runner $5_2$ formed between the cavities $3_2$ and $4_2$ are bored through the metal mold $1_2$ and the moving and fixed die plates 8 and 9 in alignment with the runner $5_2$ and delivery rods 11 and 11' are inserted into the apertures 10 and 10' from the outside of the moving and fixed die plates 8 and 9. The delivery rods 11 and 11' are piston rods of cylinders 24 and 24' mounted on the moving and fixed die plates 8 and 9 and these piston rods 11 and 11' are driven by liquid or gas introduced into the cylinders 24 and 24' through paths $24_1$ and $24_1'$ and are thereby pushed into the apertures 10 and 10', thus boring central openings 13 through disc records 12 and, at the same time, removing the material remaining in the runner $5_2$.

In the metal mold $1_2$ metal mold mounting portions 15, 16 and 15', 16' are formed in the templets $1a_2$, $1b_2$ and $1c_2$, $1d_2$ and pairs of metal molds 17 and 18, 17' and 18' are respectively fastened to the metal mold mounting portions 15, 16 and 15', 16' by means of screws 19 (refer to FIG. 3). The opposing faces of the pairs of metal molds 17 and 18 have formed therein recesses 20 and 21 (and 20' and 21' though not shown), each having a diameter which is the same as the outer diameter of a disc record to be molded. Further, thin stampers 22 and 23 (and 22' and 23' though not shown), which have transferred thereon sound grooves of each side of the disc record, are mounted in the recesses 20 and 21 of the metal molds 17 and 18, and the aforementioned cavities $3_2$ and $4_2$ are defined between the pair of metal molds 17 and 18, that is, between the stampers 22 and 23.

Referring now to FIG. 4, a description will be given of the operation of this invention machine of the construction described above. In the first place, a molten material is injected into the disc record molding cavities $3_2$ and $4_2$ of the metal mold $1_2$ clamped as shown in FIG. 4A through the sprue $6_2$ and the runner $5_2$ from the nozzle $2_2$ disposed, for example, above the split metal mold $1_2$, the nozzle $2_2$ being movable up and down. Then, before the injected material becomes hardened, the moving die plate 8 is shifted as depicted in FIG. 4B to separate the templet $1b_2$ joined with the templet $1a_2$ from the templet $1c_2$ joined with the templet $1d_2$. At the same time, the cylinders 24 and 24' are driven to push the delivery rods 11 and 11' towards the disc records 12 molded by the cavities $3_2$ and $4_2$, thus making the central opening 13 in the disc records 12 and pushing out the excess material remaining in the runner $5_2$ to a gap defined between the separated templets $1b_2$ and $1c_2$. Following this, the delivery rods 11 and 11' are brought back to the positions depicted in FIG. 4A and the moving die plate 8 is held in the condition depicted in FIG. 4B and the rotary arms 28 and 28' are pushed by the piston rods 33 and 33' of the cylinders 32 and 32' in directions indicated by arrows $a_1$ and $a_1'$ in FIG. 5, disengaging the ends of the rotary arms 28 and 28' from the recesses 30 and 30' of the templets $1a_2$ and $1d_2$. Upon this disengagement, the templets $1b_2$ and $1c_2$ are separated by the biasing force of the springs 27 and 27' from the templets $1a_2$ and $1d_2$ as shown in FIG. 4C to provide gaps between the templets $1a_2$ and $1b_2$ and between $1c_2$ and $1d_2$, so that molded disc records 12 can be collected by suitable means such as, for example, scraping means, air-blower, a two-stage ejector means or the like. After the collection of the disc records 12, the moving die plate 8 is moved by drive means (such as a piston, though not shown,) on the guide rods 25 back to its initial position depicted in FIG. 4A, in which case the free ends of the rotary arms 28 and 28' are again brought into engagement with the recesses 30 and 30' formed in the templets $1a_2$ and $1d_2$, with the result that the templets $1a_2$ and $1d_2$ are returned to their initial position depicted in FIG. 4A.

With the above arrangement, simultaneous injection molding of two disc records can be achieved with one shot of the molten material, the central openings can be bored through the both records within the time for one shot of the injection molding and the molded disc records can be readily collected in a short time. Further, replacement of the record stampers 22 and 23 can be rapidly achieved. In addition, the injection molding can be achieved without causing unwanted separation of the templets by an injection molding machine having a mold clamping force substantially equal to that for injection molding of one disc record, so that the injection molding machine may be relatively small in size. It is possible to use an injection molding machine of the type consisting of separate injecting unit and mold clamping unit disposed in the form of an L and capable of injection molding from the side of the mold. Since the disc record injection molding machine is of the type that the mold is separated into individual templets in a transverse direction, the molded disc records can be dropped by gravity for collection and the waste material remaining in the sprue $6_2$ and in the runner $5_2$ and resulting from the formation of the central openings of the disc records can also be dropped out from the mold. Accordingly, the injection molding machine of this invention simplifies a mechanism for full automatic operation, and hence is advantageous in practical use. Further, the cavities $3_2$ and $4_2$ are formed symmetrical relative to the axial direction of the nozzle, namely, the lengths of the runners to the both cavities are equal to each other, so that the molten material is uniformly injected into the both cavities $3_2$ and $4_2$ and the amount of the molten material injected from the nozzle can be easily controlled and, in addition, the lengths of the runners can be shortened. Consequently, the aforementioned short shot can be avoided to ensure the production of disc records having sound grooves of a standardized size. Further, since the central openings 13 of the disc records 12 are formed during injection molding before the injected material in the cavities $3_2$ and $4_2$ and in the runner $5_2$ becomes hardened, the manufacturing operation can be achieved efficiently. Namely, it is considered possible to form the central openings after the molded disc records are taken out from the metal mold, but this increases manufacturing operations and the formation of the central openings through the hardened plastic material with high accuracy (7.06 ± 0.05 mm.) requires an additional equipment and a considerable amount of time, which results in high-manufacturing cost. In the present invention, however, such an equipment is not required and in the case of boring central openings having a large diameter of 38.2 ± 0.05 mm. through 45-revolution disc records of a diameter of 17 cm., the central openings can be bored relatively easily by means of a puncher while using as guides the central openings bored in the injection molding. Further, 33⅓-revolution disc records having diameters of 30, 25 and 17 cm. can be finished only by labelling after molded. Thus, the use of the injection molding machine of this inven,ion decreases the manufacturing cost of the disc records and is suitable for mass production thereof. It is possible, of course, to increase the diameter of the central opening, if necessary.

Turning now to FIGS. 6 and 7, another example of this invention will hereinafter be described. In the present example right- and left-hand split metal molds $1_3$ and $1_3'$ are made up of four templets $1a_3$, $1b_3$, $1c_3$ and $1d_3$ and disc record molding cavities $3_3$ and $3_4$, which are symmetrical relative to the axis of an injection nozzle $2_3$ attached to an injection cylinder $7_3$ and have planes parallel with the axial direction of the nozzle $2_3$, are provided in side-by-side relation between the templets $1a_3$ and $1b_3$ and between $1c_3$ and $1d_3$, as shown in FIG. 6. In the templets $1b_3$ and $1c_3$ sprue runners $5_3$ and $5_3'$ leading to the central portions of the cavities $3_3$ and $4_3$ are formed straight in a manner to run across the planes of the cavities $3_3$ and $4_3$ substantially at right angles thereto. Between the templets $1b_3$ and $1c_3$ open end portions or sprues $6_3$ and $6_3'$ of the nozzle $2_3$ are provided symmetrically relative to the axial direction of the nozzle $2_3$. The lengths of the runners or sprue runners from the nozzle $2_3$ to the cavities $3_3$ and $4_3$ are selected equal to each other and it is preferred to shorten the lengths of the sprue runners as much as possible.

With such an arrangement, a disc record material is injected uniformly into the both cavities $3_3$ and $4_3$ from the nozzle $2_3$ to ensure simultaneous injection molding of two disc records of equally excellent quality with one shot.

In the illustrated example the templet $1a_3$ of the left-hand metal mold $1_3$ is fixed to a left-hand moving bed $8_3$, while the templet $1d_3$ of the right-hand metal mold $1_3'$ is similarly fixed to a right-hand moving bed $9_3$. The intermediate templets $1b_3$ and $1c_3$ of the metal molds $1_3$ and $1_3'$ are coupled to the moving beds $8_3$ and $9_3$ or the templets $1a_3$ and $1d_3$ in a manner to be movable by a predetermined distance together therewith. Namely, the moving beds $8_3$ and $9_3$ are slidably mounted on plural, for example, four parallel guide rods $25_3$ and the templets $1b_3$ and $1c_3$ are also slidably mounted on the guide rods 25 through projecting pieces 26 and 26' projecting from the one side of the templets $1b_3$ and $1c_3$. Further, substantially L-shaped rotary arms 28 and 28' are rotatably mounted by means of pins 29 and 29' on the other projecting pieces $26_1$ and $26_1'$ of the templets $1b_3$ and $1c_3$ and the rotary arms 28 and 28' are designed such that one free end of each of the arms may engage recess 30, 30' formed in the templet $1a_3$, $1d_3$. Substantially in parallel with the guide rods 25 and opposite the other free ends of the rotary arms 28 and 28', there are provided on the moving beds $8_3$ and $9_3$ pistons 31 and 31' and cylinders 32 and 32' which are actuated by oil or pneumatic pressure. The pistons 31 and 31' are provided with piston rods 33 and 33', the free ends of which are pivoted to the other ends of the L-shaped rotary arms 28 and 28'. When the templets $1b_3$ and $1c_3$ have been moved a certain distance away from the nozzle $2_3$ together with the moving beds $8_3$ and $9_3$, the L-shaped rotary arms 28 and 28' are respectively pushed at the other free ends with the piston rods 33 and 33' by driving the cylinders 32 and 32' to disengage the free ends of the L-shaped rotary arms 28 and 28' from the templets $1a_3$ and $1b_3$ and, at the same time, the templets $1a_3$ and $1d_3$ are moved away from the templets $1b_3$ and $1c_3$ by the sliding movement of the moving beds $8_3$ and $9_3$ to provide gaps between the templets $1a_3$ and $1b_3$ and between $1c_3$ and $1d_3$, from which disc records molded in the cavities $3_3$ and $4_3$ are taken out. Springs 34 and 34' are respectively mounted on the piston rods 33 and 33' between the cylinder 32 and the rotary arm 28 and between the cylinder 32' and the rotary arm 28' and these springs 34 and 34' serve to engage the free ends of the L-shaped rotary arms 28 and 28' with the recesses 30 and 30' formed in the templets $1a_3$ and $1d_3$ and to hold the rotary arms 28 and 28' in their engaging condition when the templets $1a_3$, $1b_3$, $1c_3$ and $1d_3$ are clamped together as depicted in FIG. 6, that is, when the cylinders are inoperative. One to two or one to four cylinders and rotary arms are mounted on the moving beds and the templets $1b_3$ and $1c_3$ as occasion demands.

Further, apertures $10_3$ and $10_3'$ of the same diameter as the sprue runners $5_3$ and $5_3'$, formed in the metal molds $1_3$ and $1_3'$ between the cavities $3_3$ and $4_3$, bored through the metal molds $1_3$ and $1_3'$ and the moving beds $8_3$ and $9_3$ in alignment with the sprue runners $5_3$ and $5_3'$. Delivery rods 11 and 11', which are actuated by cylinders 24 and 24' provided outside the moving beds $8_3$ and $9_3$, are inserted into the apertures $10_3$ and $10_3'$, by means of which central openings 13 of disc records 12 molded as described later are bored and the record material remaining in the sprue runners $5_3$ and $5_3'$. Reference numerals $24_1$ and $24_1'$ designate pistons which actuate the delivery rods 11 and 11' with oil or pneumatic pressure introduced into the cylinders 24 and 24'.

In the contact faces of the templets $1a_3$, $1b_3$ and $1c_3$, $1d_3$ of the metal molds $1_3$ and $1_3'$ there are respectively formed recessed portions 20, 21 and 20', 21' which have a diameter corresponding to the outer diameter of disc records desired to be molded. Stampers 22, 23 and 22', 23', which have transferred thereon sound grooves of one side of the records, are mounted in the recessed portions 20, 21 and 20', 21' and the cavities $3_3$ and $3_4$ are respectively formed between the stampers 22 and 23 and between 22' and 23'.

As is apparent from FIG. 6, an injection unit A including the injection cylinder $7_3$ and the metal molds $1_3$ and $1_3'$ and mold clamping units B and B' for driving the moving beds $8_3$ and $9_3$ are coupled together in the form of a T. In this case, the mold clamping units B and B' are of a double door type relative to the injection unit A. An in-line-screw-type injection unit is suitable for use in the injection molding machine of this invention. The injection unit A may be disposed in the form of a T relative to the mold clamping units B and B' so that the record material is injected into the metal mold from its side or the unit A may be arranged in a manner to inject the material into the mold from above. The injection cylinder $7_3$ of the injection unit A has disposed therein a screw $7_5$ and has attached thereto a hopper for containing a raw resinous material, though not shown. Reference numerals $7_4$ indicate heaters for heating the cylinder $7_3$ to melt the resin contained therein.

Further, a delivery rod 31a is provided in alignment with the nozzle $2_3$ of the cylinder $7_3$ of the injection unit A, by means of which the resin remaining in the nozzle $2_3$ is pushed back into the cylinder $7_3$ after the resin has been injected from the injec- $^{tion\ cylinder}$ $7_3$ into the cavities $3_3$ and $4_3$. Reference numeral $31_1$ designates a piston actuated by oil or pneumatic pressure and $31_2$ a cylinder for the piston $31_1$. One end of the delivery rod $31a$ is fixed to the piston $31_1$. The nozzle $2_3$ has incorporated therein a heater 35 for holding the resin contained therein in its molten condition.

In the illustrated example the injection cylinder $7_3$ of the injection unit A and the cylinder $31_2$ for the delivery rod $31a$ are formed integral with each other.

In the mold clamping units B and B' piston rods 32 and 32' are respectively attached at one end to the moving beds $8_3$ and $9_3$ and pistons 33 and 33' are respectively disposed in mold clamping cylinders 36 and 36'. Further, the piston rods $32a$ and $32a'$ are fixed at the free end to the pistons 37 and 37', which are actuated by oil pressure in the cylinders 36 and 36'. The cylinders 36 and 36' are mechanically coupled together through the aforementioned four guide rods $25_3$. The mold clamping units may be any types widely used in conventional injection molding machines other than the cylinders of direct pressure type.

Referring now to FIG. 8, a description will be given of the operation of the machine described above. In the first place, a mold material is injected into the disc record molding cavities $3_3$ and $4_3$ of the metal molds $1_3$ and $1_3'$ through the sprue runners $5_3$ and $5_3'$ from the nozzle $2_3$ attached to the cylinder $7_3$ arranged on the metal molds, as shown in FIG. 8A.

Then, the injected material in the nozzle $2_3$ is brought back into the cylinder $7_3$ by the delivery rod $31a$ of the cylinder $31_2$ directly coupled to the top of the nozzle $2_3$, as depicted in FIG. 8B. The material brought back into the cylinder is again mixed with the material present at the top of the cylinder $7_3$.

Next, before the injected material in the sprue runners becomes hardened, the moving beds $8_3$ and $9_3$ are shifted in opposite directions by the pistons 37 and 37' of the mold clamping cylinders 36 and 36' to separate the templets $1a_3$, $1b_3$ or the metal mold $1_3$ and $1c_3$, $1d_3$ or the metal mold $1_3'$ from the injection nozzle $2_3$, after which the delivery rods 11 and 11' are pushed out through the sprue runners by the pistons $24_1$ and $24_1'$ of the cylinders 24 and 24', thereby to bore central openings 13 through the molded records 12 and to push out the material remaining in the sprue runners $5_3$ and $5_3'$ therefrom as shown in FIG. 8C.

Following this, the delivery rods 11 and 11' are brought back to predetermined positions, as depicted in FIG. 8D, to hold the templets $1b_3$ and $1c_3$ in such a condition as shown in FIG. 8C and then the templets $1a_3$ and $1d_3$ are further brought back away from the templets $1b_3$ and $1c_c$. This may take place by the turning of the rotary arms 28 and 28' with the motion of the piston rods 33 and 33' of the cylinders 32 and 32' to separate the templet $1a_3$ from $1b_3$ and $1c_3$ from $1d_3$. After this, the molded disc records 12 are dropped by desired means such as scraping means, an air-blower, two-stage ejector means, remover means or the like (not shown) for collection. Subsequent to the collection of the disc records 12, the moving beds $8_3$ and $9_3$ and the templets $1a_3$ to $1d_3$ are returned to their initial positions shown in FIG. 8A. The above operations are sequentially repeated for producing disc records.

FIG. 9 illustrates another modified form of the disc record injection molding machine of this invention, in which the cylinders 32 and 32' and the rotary arms 28 and 28' in FIG. 6 are left out and the templets $1b_3$ and $1c_3$ are fixed to the cylinder $7_3$. In the present example, the other elements are substantially the same as those in FIG. 6 and similar elements to those in FIG. 6 are identified by the same reference numerals and no description will be made thereon for the sake of brevity.

Turning now to FIGS. 10A, 10B, 10C and 10D, a description will be given of the operation of the injection molding machine exemplified in FIG. 9. As shown in FIG. 10A, a mold material is injected into disc record molding cavities $3_3$ and $4_3$ through sprue runners $5_3$ and $5_3'$ from a nozzle $2_3$ attached to an injection cylinder $7_3$ disposed on metal molds $1_3$ and $1_3'$.

Then, before the injected material in the sprue runners becomes hardened, delivery rods 11 and 11' attached to moving beds $8_3$ and $9_3$ are pushed into the sprue runners by cylinders 24 and 24', by which central openings 13 are bored through disc records 12 and, at the same time, the mold material remaining in the sprue runners $5_3$ and $5_3'$ are brought back into the nozzle, as illustrated in FIG. 10B.

Following this, a delivery rod $31a$ which is attached to a cylinder $31_2$ directly coupled to the top of the nozzle, is pushed out to bring back the material in the nozzle $2_3$ into the cylinder $7_3$ to close the nozzle, as shown in FIG. 10C. The mold material returned to the cylinder $7_3$ is again mixed with the material at the top of the cylinder $7_3$.

Then, the delivery rods 11 and 11' are respectively brought back to a predetermined position and the moving beds $8_3$ and $9_3$ are moved in opposite directions as shown in FIG. 10D and, at this time, the templets $1a_3$ and $1d_3$ are simultaneously separated respectively from the templets $1b_3$ and $1c_3$ held in contact with the cylinder $7_3$ and the molded disc records 12 are dropped by any desired means such as scraping means, an air blower, two-stage ejector means or the like for collection. After the collection of the disc records 12 the moving beds $8_3$ and $9_3$ and the templets $1a_3$ to $1d_3$ are returned to the conditions shown in FIG. 6A for subsequent injection molding.

With the above arrangement, simultaneous injection molding of two disc records can be achieved with one shot of the molten material, the central openings can be bored through the both records within the time for one shot of the material and the molded disc records can be readily collected in a short time. Further, the injection molding can be achieved with an injection molding machine of substantially the same injection pressure and clamping force as those required for one disc record injection molding, so that the injection molding machine is relatively inexpensive. Since the disc record injection molding machine is of the type that the split mold is separated into individual templets in a transverse direction, the molded disc records can be dropped by gravity for collection and the waste material remaining in the sprue and in the runner and resulting from the boring of the central openings of the disc records can also be dropped out or removed from the mold by remover means.

Further, since the central openings of the disc records are formed during the injection molding before the injected material in the cavities and in the runner becomes hardened, the manufacturing operation is efficient. Namely, it is considered possible to form the central openings after the molded disc records are taken out from the metal mold, but this increases manufacturing operations and the formation of the central openings through the hardened plastic material with high accuracy ($7.06 \pm 0.05$ mm.) requires an additional equipment and a considerable amount of time, which results in an increase in the manufacturing cost. In the present invention, however, such an equipment is not required and in the case of boring central openings having a large diameter of $38.2 \pm 0.05$ mm. through 45-revolution disc records of a diameter of 17 cm., the central openings can be bored relatively easily by means of a puncher while using as guides the central openings previously bored during the injection molding. Further 33⅓-revolution disc records having diameters of 30, 25 and 17 cm. can be finished only by labelling after molding. Thus, the use of the injection molding machine of this invention decreases the manufacturing cost of the disc records and is suitable for mass production.

It will be apparent that many modifications and variations may be effected without departing from the scope of the novel concepts of this invention.

I claim:

1. A disc record injection molding machine comprising at least four abutting plates in sequence, each of the plates having a molding cavity therein which cooperates with a corresponding cavity on the next adjacent plate to thereby form a composite mold cavity between the first and second plates and between the third and fourth plates, the midplanes of said composite mold cavities being parallel to each other and said composite mold cavities being symmetrical with respect to said midplanes, means for moving said first and fourth plates laterally relative to said second and third plates to thereby open up said composite mold cavities, means in said second and third plates providing feed passages for delivering moldable material to the centers of said composite mold cavities, and a fixed nozzle disposed between said second and third plates for injecting molten moldable material to said feed passages, said feed passages being of substantially equal length, said first and fourth plates being provided with apertures coaxial with said feed passages and having the same diameter as said feed passages, said apertures being on the opposite sides of said composite molding cavity from said feed passages, delivery rods slidably mounted in said apertures and arranged to slide through said apertures, through said composite molding cavities, and then through said feed passages, and means connecting said delivery rods to said first and fourth plates to provide for reciprocating movement of said delivery rods through said feed passages.

* * * * *